United States Patent
Morihiro

(10) Patent No.: US 9,664,096 B2
(45) Date of Patent: May 30, 2017

(54) CONTROL APPARATUS FOR INTERNAL COMBUSTION ENGINE

(71) Applicant: Toyota Jidosha Kabushiki Kaisha, Toyota-shi, Aichi-ken (JP)

(72) Inventor: Kinji Morihiro, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/831,191

(22) Filed: Aug. 20, 2015

(65) Prior Publication Data
US 2016/0061130 A1    Mar. 3, 2016

(30) Foreign Application Priority Data

Sep. 2, 2014  (JP) .................................. 2014-178370

(51) Int. Cl.
*F01N 3/00*  (2006.01)
*F01N 11/00*  (2006.01)
(Continued)

(52) U.S. Cl.
CPC ........ *F01N 11/007* (2013.01); *F02D 41/0085* (2013.01); *F02D 41/1441* (2013.01);
(Continued)

(58) Field of Classification Search
CPC ............... F01N 11/007; F01N 2550/02; F02D 41/0085; F02D 41/1441; F02D 41/1456; F02D 41/2454; F02D 41/3094
See application file for complete search history.

(56) References Cited

U.S. PATENT DOCUMENTS

2003/0065438 A1* 4/2003 Katoh ................. F02D 41/1403
                                                                  701/104
2007/0125350 A1* 6/2007 Morita ................ F01L 13/0015
                                                                  123/679
(Continued)

FOREIGN PATENT DOCUMENTS

JP        2007332868 A  * 12/2007
JP        2009-030455 A     2/2009
(Continued)

*Primary Examiner* — Phutthiwat Wongwian
*Assistant Examiner* — Matthew T Largi
(74) *Attorney, Agent, or Firm* — Dinsmore & Shohl LLP

(57) ABSTRACT

An electronic control unit executes air-fuel ratio control composed of main feedback correction and sub-feedback correction. The main feedback correction uses an output value of an upstream side sensor in upstream side of a catalyst. The sub-feedback correction uses an output value of a downstream side sensor in downstream side of the catalyst. When there are cylinder-to-cylinder variations in a fuel injection amount of each fuel injection valve, the electronic control unit corrects the fuel injection amount. Each time the degree of the cylinder-to-cylinder variations is lower than or equal to a first predetermined value, the electronic control unit stores the sub-learning value at that point in time as a normal value, and, when the degree of the cylinder-to-cylinder variations is higher than or equal to a second predetermined value, the electronic control unit changes the sub-learning value to the stored normal value.

4 Claims, 8 Drawing Sheets

(51) Int. Cl.
    *F02D 41/00*     (2006.01)
    *F02D 41/14*     (2006.01)
    *F02D 41/24*     (2006.01)
    *F02D 41/30*     (2006.01)

(52) U.S. Cl.
    CPC ..... *F02D 41/1456* (2013.01); *F02D 41/2454* (2013.01); *F02D 41/3094* (2013.01); *F01N 2550/02* (2013.01); *Y02T 10/47* (2013.01)

(56) References Cited

U.S. PATENT DOCUMENTS

| | | | |
|---|---|---|---|
| 2010/0168986 A1* | 7/2010 | Iwazaki | F02D 41/0085 701/103 |
| 2011/0054761 A1* | 3/2011 | Sawada | F02D 41/0085 701/103 |
| 2011/0282541 A1 | 11/2011 | Kidokoro et al. | |
| 2013/0340423 A1* | 12/2013 | Tsunooka | F02D 41/2454 60/600 |

FOREIGN PATENT DOCUMENTS

| | | | |
|---|---|---|---|
| JP | 2010169038 A | * | 8/2010 |
| JP | 2010209829 A | * | 9/2010 |
| JP | 5-045820 B2 | | 10/2012 |
| JP | 2013-122214 A | | 6/2013 |
| WO | 2010-087026 A1 | | 8/2010 |

* cited by examiner

CONTROL APPARATUS FOR INTERNAL COMBUSTION ENGINE

INCORPORATION BY REFERENCE

The disclosure of Japanese Patent Application No. 2014-178370 filed on Sep. 2, 2014 including the specification, drawings and abstract is incorporated herein by reference in its entirety.

BACKGROUND OF THE INVENTION

1. Field of the Invention

The invention relates to a control apparatus for an internal combustion engine.

2. Description of Related Art

In an internal combustion engine, in order to exercise the exhaust gas purification performance of a catalyst provided in an exhaust passage, sensors are provided in the exhaust passage. Each of the sensors outputs an output value corresponding to the concentration of oxygen in exhaust gas. Air-fuel ratio control for correcting a fuel injection amount is executed such that the output value of each sensor becomes an output value corresponding to a target air-fuel ratio. In this air-fuel ratio control, main feedback correction is carried out with the use of the upstream-side sensor. The upstream-side sensor outputs an output value corresponding to an actual air-fuel ratio in the exhaust passage upstream of the catalyst for purifying exhaust gas. In the air-fuel ratio control, sub-feedback correction is also carried out with the use of the downstream-side sensor to calculate a sub-correction value and then to correct the fuel injection amount, which is corrected through the main feedback correction, by using the sub-correction value. The downstream-side sensor outputs an output value corresponding to an actual air-fuel ratio in the exhaust passage downstream of the catalyst. As one of correction values that constitute the sub-correction value, a learning value that compensates for a steady deviation between an output value corresponding to the actual air-fuel ratio and an output value corresponding to the target air-fuel ratio is often used.

Incidentally, there may occur variations in fuel injection amount among cylinders, and, as a result, there may occur variations in air-fuel ratio among the cylinders. For example, there is known a technique for, when there are such cylinder-to-cylinder variations, accurately controlling the air-fuel ratios that are respectively required of cylinders by changing corresponding target air-fuel ratios (for example, Japanese Patent Application Publication No. 2013-122214 (JP 2013-122214 A), or the like).

There is known that, when the air-fuel ratio of part of the cylinders, for example, deviates to the rich side with respect to the air-fuel ratios of the other cylinders, the above-described upstream-side sensor detects hydrogen because of a high concentration of hydrogen that is emitted from the cylinders and the output value of the upstream-side sensor deviates to the rich side with respect to an output value corresponding to an actual air-fuel ratio (for example, Japanese Patent Application Publication No. 2009-30455 (JP 2009-30455 A), or the like).

When the output value of the upstream-side sensor deviates to the rich side in this way, the actual air-fuel ratio is erroneously corrected to the lean side with respect to the target air-fuel ratio in the main feedback correction in the above-described air-fuel ratio control. On the other hand, hydrogen contained in exhaust gas is oxidized as the hydrogen passes through the catalyst, so the output value of the downstream-side sensor, different from the output value of the upstream-side sensor, becomes an output value corresponding to an actual air-fuel ratio. Therefore, the actual air-fuel ratio excessively corrected to the lean side through the main feedback correction is detected by the downstream-side sensor, and a sub-correction value for increasing the fuel injection amount is calculated in order to correct the actual air-fuel ratio to the rich side in the sub-feedback correction. A deviation (in this case, a lean deviation) of the actual air-fuel ratio with respect to the target air-fuel ratio due to a deviation of the output value of the upstream-side sensor is gradually suppressed by the thus calculated sub-correction value.

On the other hand, a lean deviation of the actual air-fuel ratio due to a deviation of the output value of the upstream-side sensor at the time when there are cylinder-to-cylinder variations can also be suppressed by increasing the fuel injection amount corrected through the air-fuel ratio control. In this case, the actual air-fuel ratio becomes rich as a result of an increase in the fuel injection amount. Therefore, after enrichment of the actual air-fuel ratio is started by increasing the fuel injection amount, the learning value of the sub-correction value gradually decreases and converges to an appropriate value.

Before enrichment of the actual air-fuel ratio is started by increasing the fuel injection amount, enrichment of the actual air-fuel ratio is achieved by using the sub-correction value, and the learning value that compensates for a steady deviation between the output value of the downstream-side sensor and the output value corresponding to the target air-fuel ratio is a relatively large value. Therefore, just after enrichment of the actual air-fuel ratio is started by increasing the fuel injection amount in the state where the learning value is a relatively large value, there is a possibility that the fuel injection amount is excessively increased and, as a result, the actual air-fuel ratio becomes excessively rich. The above excessive enrichment of the actual air-fuel ratio is eliminated as the learning value of the sub-correction value gradually decreases and converges to an appropriate value as described above. However, a certain time is required for the learning value to converge to an appropriate value, so there is a concern that the exhaust gas purification performance decreases until the learning value converges to an appropriate value.

Similarly, when the actual air-fuel ratio becomes rich because of a deviation of the output value of the upstream-side sensor at the time when there are cylinder-to-cylinder variations, a rich deviation of the actual air-fuel ratio can be suppressed by reducing the fuel injection amount corrected through the air-fuel ratio control. However, in this case as well, before leaning of the actual air-fuel ratio is started by reducing the fuel injection amount, leaning of the actual air-fuel ratio is achieved by using the sub-correction value, and the learning value that compensates for a steady deviation between the output value of the downstream-side sensor and the output value corresponding to the target air-fuel ratio is a relatively large value. Therefore, just after leaning of the actual air-fuel ratio is started by reducing the fuel injection amount in the state where the learning value is a relatively large value, there is a possibility that the fuel injection amount is excessively reduced and, as a result, the actual air-fuel ratio becomes excessively lean. The above excessive leaning of the actual air-fuel ratio is eliminated as the learning value of the sub-correction value gradually decreases and converges to an appropriate value as described above. However, a certain time is required for the learning value to converge to an appropriate value, so there is a concern that the exhaust gas purification performance decreases until the learning value converges to an appropriate value.

SUMMARY OF THE INVENTION

The invention is contemplated in view of the above situation, and provides a control apparatus for an internal combustion engine, which is able to suppress the deterioration of exhaust gas purification performance at the time when there are cylinder-to-cylinder variations by reducing a time that is taken for a learning value of a sub-correction value to converge to an appropriate value.

An aspect of the invention provides a control apparatus for an internal combustion engine. The control apparatus includes fuel injection valves, a catalyst, an upstream-side sensor, a downstream-side sensor and an electronic control unit. The fuel injection valves are configured to inject fuel. The catalyst is provided in an exhaust passage and the catalyst is configured to purify gas that is emitted from the internal combustion engine. The upstream-side sensor is arranged upstream of the catalyst and the upstream-side sensor is configured to output an output value corresponding to an actual air-fuel ratio of gas that is emitted from the internal combustion engine. The downstream-side sensor is configured to be arranged downstream of the catalyst and to output an output value corresponding to an actual air-fuel ratio of gas that is emitted from the catalyst. The electronic control unit is configured to (i) execute air-fuel ratio control including main feedback correction and sub-feedback correction. The main feedback correction is correction for fuel injection amount that is injected from the fuel injection valves such that the output value of the upstream-side sensor becomes an output value corresponding to a target air-fuel ratio. The sub-feedback correction is correction for the fuel injection amount that is corrected through the main feedback correction such that the output value of the downstream-side sensor becomes an output value corresponding to the target air-fuel ratio. The sub-correction value includes a learning value that compensates for a steady deviation between the output value of the downstream-side sensor and the output value corresponding to the target air-fuel ratio. The electronic control unit is configured to (ii) when there are cylinder-to-cylinder variations in the fuel injection amount that is injected from the fuel injection valves, execute a process of correcting the fuel injection amount that is corrected in the air-fuel ratio control. The electronic control unit is configured to (iii) each time the electronic control unit determines that a degree of the cylinder-to-cylinder variations is lower than or equal to a first predetermined value, store the learning value at that point in time as a normal value; whereas, and (iv) when the degree of the cylinder-to-cylinder variations is higher than or equal to a second predetermined value, change the learning value at that point in time to the normal value.

When the degree of the cylinder-to-cylinder variations is lower than or equal to the first predetermined value and when there is no abnormality in the cylinder-to-cylinder variations, a deviation of the output value of the upstream-side sensor decreases, so a lean deviation or rich deviation of the actual air-fuel ratio due to a deviation of the output value of the upstream-side sensor is suppressed. Therefore, in this state, the output value of the downstream-side sensor is close to the output value corresponding to the target air-fuel ratio, and the learning value of the sub-correction value, which compensates for a steady deviation between the output value of the downstream-side sensor and the output value corresponding to the target air-fuel ratio, is a small value as compared to the case where there is an abnormality in the cylinder-to-cylinder variations.

With the above-described control apparatus for an internal combustion engine, when the degree of the cylinder-to-cylinder variations is lower than or equal to the first predetermined value and each time it is determined that there is no abnormality in the cylinder-to-cylinder variations, the learning value of the sub-correction value at that point in time is stored as the normal value. When the degree of the cylinder-to-cylinder variations is higher than or equal to the second predetermined value and when it is determined that there is an abnormality in the cylinder-to-cylinder variations, the learning value of the sub-correction value at that point in time is changed to the normal value that is updated each time it is determined that there is no abnormality in the cylinder-to-cylinder variations. Therefore, when it is determined that there is an abnormality in the cylinder-to-cylinder variations, the learning value set to a large value is changed to a small value. Because the learning value is quickly changed from a large value to a small value in this way, a time required until the learning value of the sub-correction value gradually decreases and converges to an appropriate value is reduced. Thus, it is possible to suppress the deterioration of exhaust gas purification performance at the time when there are cylinder-to-cylinder variations.

In the configuration of the control apparatus, when there are cylinder-to-cylinder variations, the process of further correcting the fuel injection amount that is corrected in the air-fuel ratio control is executed. However, when it is determined that there is an abnormality in the cylinder-to-cylinder variations, the actual air-fuel ratio is enriched or leaned by using the correction value of the fuel injection amount, which is set in the correction process, and the sub-correction value including the learning value changed from a large value to a small value.

Therefore, in comparison with the case where enrichment of the actual air-fuel ratio is started by increasing the fuel injection amount or leaning of the actual air-fuel ratio is started by reducing the fuel injection amount in the state where the learning value is a relatively large value without any change, excessive correction of the fuel injection amount is suppressed. Therefore, it is possible to suppress an excessive rich or excessively lean air-fuel ratio after enrichment or leaning of the actual air-fuel ratio is started by using the correction value. With this as well, it is possible to suppress the deterioration of exhaust gas purification performance at the time when there are cylinder-to-cylinder variations.

In the control apparatus, the electronic control unit may be configured to: (i) increase an amount of correction of the fuel injection amount in the process of further correcting the fuel injection amount that is corrected in the air-fuel ratio control as the degree of the cylinder-to-cylinder variations increases, and (ii) when the electronic control unit determines that the degree of the cylinder-to-cylinder variations is higher than or equal to the predetermined value and when an amount of change in the degree of the cylinder-to-cylinder variations is larger than or equal to a third predetermined value, change the learning value to the normal value.

In the control apparatus, as the degree of the cylinder-to-cylinder variations increases, a deviation of the output value of the upstream-side sensor increases, with the result that the amount of deviation of the actual air-fuel ratio to the lean side or to the rich side increases. With the control apparatus, the amount of correction of the fuel injection amount in the process of further correcting the fuel injection amount may be increased as the degree of the cylinder-to-cylinder variations increases as in the case of the above configuration.

When a change in the degree of the cylinder-to-cylinder variations is larger than or equal to the third predetermined value, an amount of correction of the fuel injection amount steeply increases. Therefore, when the fuel injection amount is further steeply corrected in the state where the learning value of the sub-correction value is a relatively large value, there is a concern that the actual air-fuel ratio becomes excessively rich or excessively lean. In the case where the amount of correction of the fuel injection amount is increased as the degree of the cylinder-to-cylinder variations increases, when the electronic control unit determines that the degree of the cylinder-to-cylinder variations is higher than or equal to the above-described second predetermined value, that is, when it is determined that there is an abnormality in the cylinder-to-cylinder variations, and when a change in the degree of the cylinder-to-cylinder variations is larger than or equal to the third predetermined value, it is desirable to change the learning value of the sub-correction value to the normal value. With the above-described control apparatus, when there is an abnormality in the cylinder-to-cylinder variations and a change in the degree of the cylinder-to-cylinder variations is large, that is, when there is a concern that the fuel injection amount is further steeply corrected in the state where the learning value of the sub-correction value is a relatively large value, the learning value of the sub-correction value is changed to a small value, so it is possible to suppress an excessively rich or excessively lean actual air-fuel ratio.

In the control apparatus, the fuel injection valves may include intake port fuel injection valves and in-cylinder fuel injection valves respectively provided for a plurality of cylinders. Each of the intake port fuel injection valves is configured to inject fuel into a corresponding one of intake ports of the internal combustion engine. Each of the in-cylinder fuel injection valves is configured to inject fuel into a corresponding one of the cylinders of the internal combustion engine. The electronic control unit may be configured to: (i) each time the electronic control unit determines that both the degree of cylinder-to-cylinder variations in the fuel injection amount that is injected from the intake port fuel injection valves and the degree of cylinder-to-cylinder variations in the fuel injection amount that is injected from the in-cylinder fuel injection valves are lower than or equal to the first predetermined value, store the learning value at that point in time as the normal value, and (ii) when the electronic control unit determines that at least one of the degree of cylinder-to-cylinder variations in the fuel injection amount that is injected from the intake port fuel injection valves or the degree of cylinder-to-cylinder variations in the fuel injection amount that is injected from the in-cylinder fuel injection valves, change the learning value of the sub-correction value at that point in time to the stored normal value.

When it is determined that there is no abnormality in both the cylinder-to-cylinder variations associated with the intake port fuel injection valves and the cylinder-to-cylinder variations associated with the in-cylinder fuel injection valves, a deviation of the output value of the upstream-side sensor is small. Therefore, in this case, in comparison with the case where there is an abnormality in the cylinder-to-cylinder variations associated with at least any one set of the fuel injection valves, the learning value of the sub-correction value is set to a smaller value.

In the control apparatus, each time both the degree of the cylinder-to-cylinder variations in the fuel injection amount that is injected from the intake port fuel injection valves and the degree of the cylinder-to-cylinder variations in the fuel injection amount that is injected from the in-cylinder fuel injection valves are lower than or equal to the predetermined value and it is determined that there is no abnormality in both the cylinder-to-cylinder variations associated with the intake port fuel injection valves and the cylinder-to-cylinder variations associated with in-cylinder fuel injection valves, the learning value of the sub-correction value at that point in time is stored as the normal value. When at least one of the degree of the cylinder-to-cylinder variations in the fuel injection amount that is injected from the intake port fuel injection valves or the degree of the cylinder-to-cylinder variations in the fuel injection amount that is injected from the in-cylinder fuel injection valves is higher than or equal to the predetermined value and it is determined that there is an abnormality in the cylinder-to-cylinder variations associated with at least one set of the fuel injection valves, the learning value of the sub-correction value at that point in time is changed to the normal value that is updated each time it is determined that there is no abnormality in the cylinder-to-cylinder variations. Therefore, when it is determined that there is an abnormality in the cylinder-to-cylinder variations associated with at least one set of the fuel injection valves, the learning value set to a large value is changed to a small value. By quickly changing the learning value from a large value to a small value, a time required until the learning value of the sub-correction value gradually decreases and converges to an appropriate value is reduced. Therefore, in the internal combustion engine including the intake port fuel injection valves and the in-cylinder fuel injection valves as well, it is possible to reduce a time required until the learning value of the sub-correction value converges to an appropriate value, so it is possible to suppress the deterioration of exhaust gas purification performance at the time when there are cylinder-to-cylinder variations.

In the control apparatus, the fuel injection valves may include in-cylinder fuel injection valves respectively provided for a plurality of cylinders. Each of the in-cylinder fuel injection valves is configured to inject fuel into a corresponding one of the cylinders of the internal combustion engine. The electronic control unit may be configured to: (i) each time the electronic control unit determines that the degree of cylinder-to-cylinder variations in the fuel injection amount that is injected from the in-cylinder fuel injection valves is lower than or equal to the first predetermined value, store the learning value at that point in time as the normal value, and (ii) when the electronic control unit determines that the degree of cylinder-to-cylinder variations in the fuel injection amount that is injected from the in-cylinder fuel injection valves is higher than or equal to the second predetermined value, change the learning value at that point in time to the normal value.

According to the control apparatus, in the internal combustion engine including only the in-cylinder fuel injection valves as well, similar operation and advantageous effects to the operation and advantageous effects that are obtained in the case where the fuel injection valves include the intake port fuel injection valves and the in-cylinder fuel injection valves respectively provided for the plurality of cylinders are obtained.

As the process of further correcting the fuel injection amount that is corrected in the air-fuel ratio control, for example, the process of directly correcting the fuel injection amount may be executed or the process of correcting the target air-fuel ratio is executed to correct the fuel injection amount as a result.

The phrase "the output value corresponding to the target air-fuel ratio" in the above-described main feedback correction means the output value of the upstream-side sensor at the time when the target air-fuel ratio associated with the actual air-fuel ratio in the exhaust passage upstream of the catalyst coincides with the upstream-side actual air-fuel ratio. Similarly, the phrase "the output value corresponding to the target air-fuel ratio" in the sub-feedback correction means the output value of the downstream-side sensor at the time when the target air-fuel ratio associated with the actual air-fuel ratio in the exhaust passage downstream of the catalyst coincides with the downstream-side actual air-fuel ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment of a control apparatus for an internal combustion engine will be described with reference to FIG. 1 to FIG. 6. The control apparatus is applied to a so-called multi-cylinder internal combustion engine including a plurality of cylinders.

Figure 1:
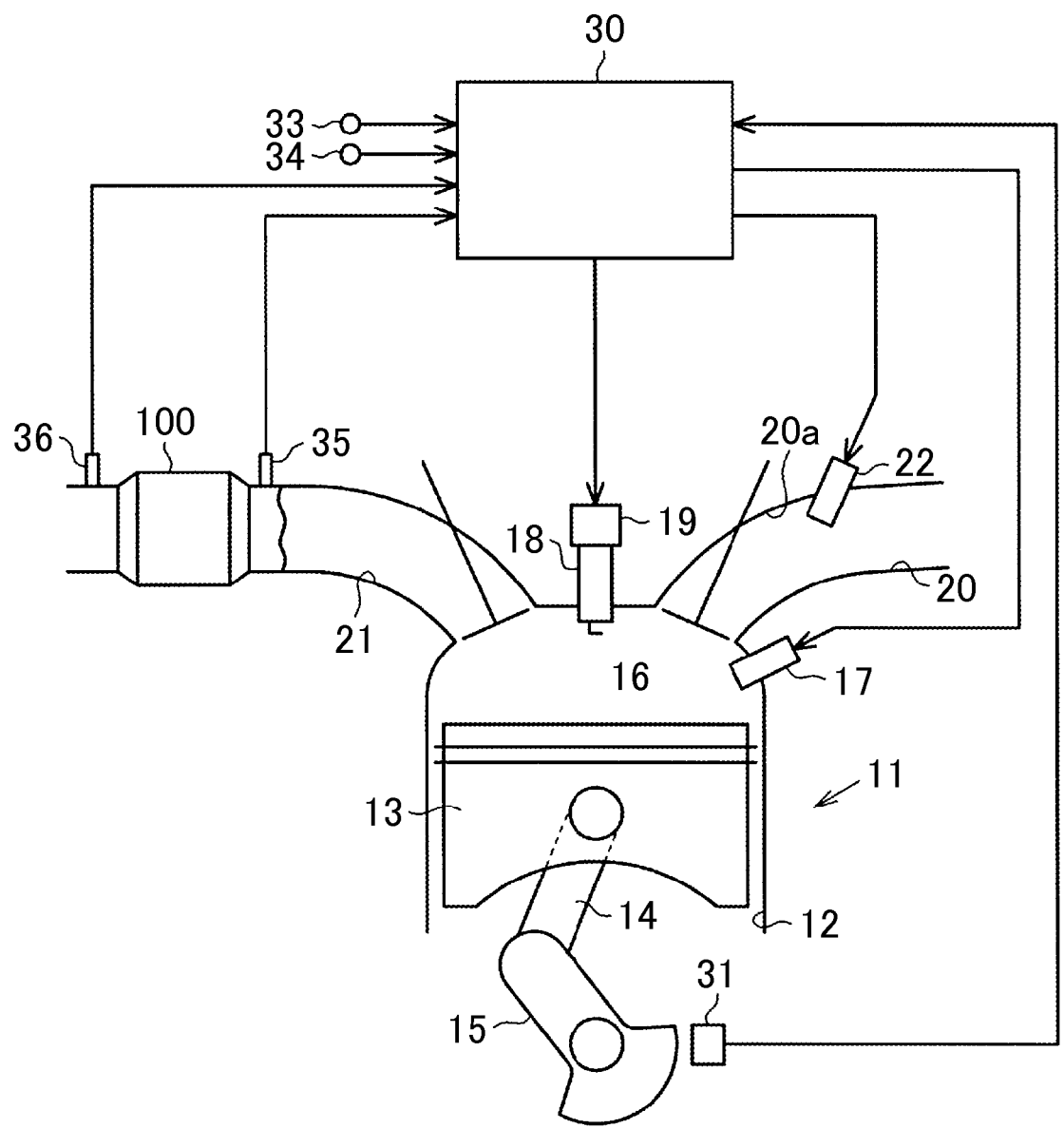
FIG. 1 is a schematic view that shows the structure of an internal combustion engine to which a controller according to an embodiment is applied as an example of the invention.

As shown in FIG. 1, a piston 13 is provided in each cylinder 12 of the internal combustion engine 11. The pistons 13 are coupled to a crankshaft 15 via corresponding connecting rods 14. The crankshaft 15 is the output shaft of the internal combustion engine 11. The reciprocal motion of the pistons 13 is converted to the rotational motion of the crankshaft 15 by the connecting rods 14.

A combustion chamber 16 is defined inside each cylinder 12 on the upper side of the corresponding piston 13. An in-cylinder injector 17 (in-cylinder fuel injection valve) is provided in each cylinder 12 so as to inject fuel into the corresponding combustion chamber 16. Fuel having a predetermined high pressure is supplied to each in-cylinder injector 17 via a known fuel supply mechanism. When each in-cylinder injector 17 is actuated to open its valve, the fuel is directly injected into the corresponding combustion chamber 16, thus carrying out so-called in-cylinder injection.

An ignition plug 18 is installed in each combustion chamber 16. Each ignition plug 18 ignites air-fuel mixture composed of fuel and air inside the corresponding combustion chamber 16. The ignition timing of air-fuel mixture by each ignition plug 18 is adjusted by an ignitor 19 provided on the upper side of the ignition plug 18.

An intake passage 20 and an exhaust passage 21 communicate with the combustion chambers 16. A port injector 22 (intake port fuel injection valve) is provided in each of intake ports 20a that constitute part of the intake passage 20. Each port injector 22 injects fuel into the corresponding intake port 20a. Fuel having a predetermined pressure is supplied to each port injector 22 via a known mechanism. When each port injector 22 is actuated to open its valve, the fuel is injected into the corresponding intake port 20a, thus carrying out so-called port injection. A throttle valve is also provided in the intake passage 20. The throttle valve regulates the amount of air that is introduced into the combustion chambers 16.

A catalyst 100 is provided in the exhaust passage 21. The catalyst 100 exercises a purification function at the time when the air-fuel ratio of air-fuel mixture falls within a predetermined range. More specifically, when the air-fuel ratio of air-fuel mixture is a stoichiometric air-fuel ratio, toxic components (mainly, HC, CO, NOx) in exhaust gas are effectively purified in the catalyst 100.

An upstream-side sensor 35 is provided in the exhaust passage 21 at a portion upstream of the catalyst 100. The upstream-side sensor 35 outputs an output value V1 corresponding to an upstream-side actual air-fuel ratio AFf that is an actual air-fuel ratio in the exhaust passage 21 upstream of the catalyst 100. The upstream-side sensor 35 is a known air-fuel ratio sensor, and outputs the output value V1 having a magnitude proportional to the air-fuel ratio of air-fuel mixture, which closely relates to the concentration of oxygen in exhaust gas. That is, with a change in the air-fuel ratio of air-fuel mixture from a rich air-fuel ratio to a lean air-fuel ratio, the output value V1 of the upstream-side sensor 35 linearly increases.

A downstream-side sensor 36 is provided in the exhaust passage 21 at a portion downstream of the catalyst 100. The downstream-side sensor 36 outputs an output value V2 corresponding to a downstream-side actual air-fuel ratio AFr that is an actual air-fuel ratio in the exhaust passage 21 downstream of the catalyst 100. The downstream-side sensor 36 is a known oxygen sensor. The downstream-side sensor 36 provides an output voltage of about 1 volt when the air-fuel ratio of air-fuel mixture is richer than the stoichiometric air-fuel ratio, and provides an output voltage of about 0 volts when the air-fuel ratio of air-fuel mixture is leaner than the stoichiometric air-fuel ratio. The downstream-side sensor 36 has such a characteristic that the output voltage suddenly changes near the stoichiometric air-fuel ratio. Therefore, although the downstream-side sensor 36 outputs the output value V2 corresponding to the downstream-side actual air-fuel ratio AFr, the output value V2 does not linearly change in response to a change in the downstream-side actual air-fuel ratio AFr, and the output value V2 is used to determine whether the actual air-fuel ratio in the exhaust passage 21 downstream of the catalyst 100 is richer or leaner than the stoichiometric air-fuel ratio.

Various controls over the internal combustion engine 11 are executed by a controller (which is also called as an electronic control unit) 30. The controller 30 includes a central processing unit (CPU), a nonvolatile memory or volatile memory, drive circuits for the in-cylinder injectors 17 and the port injectors 22, drive circuits for the ignitors 19, and the like. The CPU executes various pieces of processing associated with engine control. The nonvolatile memory or volatile memory stores control programs and information required for engine control.

In addition to the upstream-side sensor 35 and the downstream-side sensor 36, various sensors that detect engine operation states are connected to the controller 30. For example, a crank angle of the crankshaft 15 is detected by a crank sensor 31, and an engine rotation speed NE is calculated on the basis of the detected crank angle. An accelerator operation amount ACCP is detected by an accelerator sensor 33. An intake air amount GA is detected by an air flow meter 34. The controller 30 executes various controls, such as fuel injection control, air-fuel ratio control and ignition timing control, in response to the operation states of the internal combustion engine 11. The operation states of the internal combustion engine 11 are acquired from detected signals of such various sensors.

Figure 2:
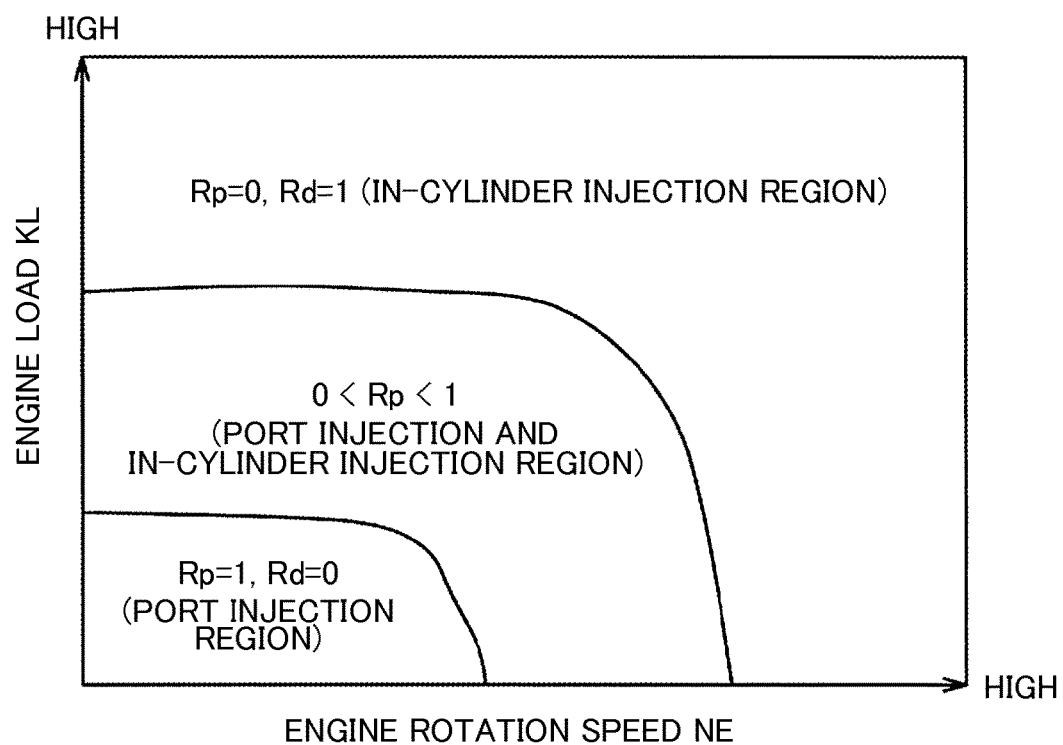
FIG. 2 is a conceptual view that shows distributed injection regions of the internal combustion engine.

The controller 30 changes an injection mode by carrying out distributed injection of fuel by the in-cylinder injectors 17 and the port injectors 22. As shown in FIG. 2, for example, only the port injection is carried out by using the port injectors 22 in a low load low rotation region, and the port injection and the in-cylinder injection are carried out by using both the port injectors 22 and the in-cylinder injectors 17 in an intermediate load intermediate rotation region. Only the in-cylinder injection is carried out by using the in-cylinder injectors 17 in a high load high rotation region. The distributed injection regions shown in FIG. 2 are one example, and may be changed as needed.

The above-described distributed injection of fuel is carried out by variously changing a port injection ratio Rp. The port injection ratio Rp indicates the ratio of the amount of fuel that is injected from the port injectors 22 within a fuel injection amount Q that is set on the basis of the engine operation states.

The port injection ratio Rp is variably set within the range of "0≤Rp≤1" on the basis of the engine operation states, such as an engine load KL and the engine rotation speed NE. The amount of fuel, which is obtained as a result of multiplying the fuel injection amount Q by the port injection ratio Rp, is set as the fuel injection amount of the port injectors 22. On the other hand, a value obtained by subtracting the port injection ratio Rp from "1" is calculated as an in-cylinder injection ratio Rd (Rd=1−Rp). The in-cylinder injection ratio Rd indicates the ratio of the amount of fuel that is injected from the in-cylinder injectors 17 within the fuel injection amount Q. The amount of fuel, which is obtained as a result of multiplying the fuel injection amount Q by the in-cylinder injection ratio Rd, is set as the fuel injection amount of the in-cylinder injectors 17.

In the case of the example shown in FIG. 2 above, in the low load low rotation region, the port injection ratio Rp is set to "1", and the in-cylinder injection ratio Rd is set to "0". In the intermediate load intermediate rotation region, the port injection ratio Rp is variably set within the range of "0<Rp<1", and the in-cylinder injection ratio Rd is also variably set accordingly. In the high load high rotation region, the port injection ratio Rp is set to "0", and the in-cylinder injection ratio Rd is set to "1". In this way, in the present embodiment, by variably setting the port injection ratio Rp in response to the engine operation states, the in-cylinder injection ratio Rd is also variably set by itself.

The controller 30 monitors whether there are variations in air-fuel ratio among the cylinders of the internal combustion engine 11. More specifically, one of causes of such variations in air-fuel ratio is variations in fuel injection amount among the cylinders, and an imbalance ratio IMB that is an index value indicating such cylinder-to-cylinder variations in fuel injection amount is acquired.

Figure 3:
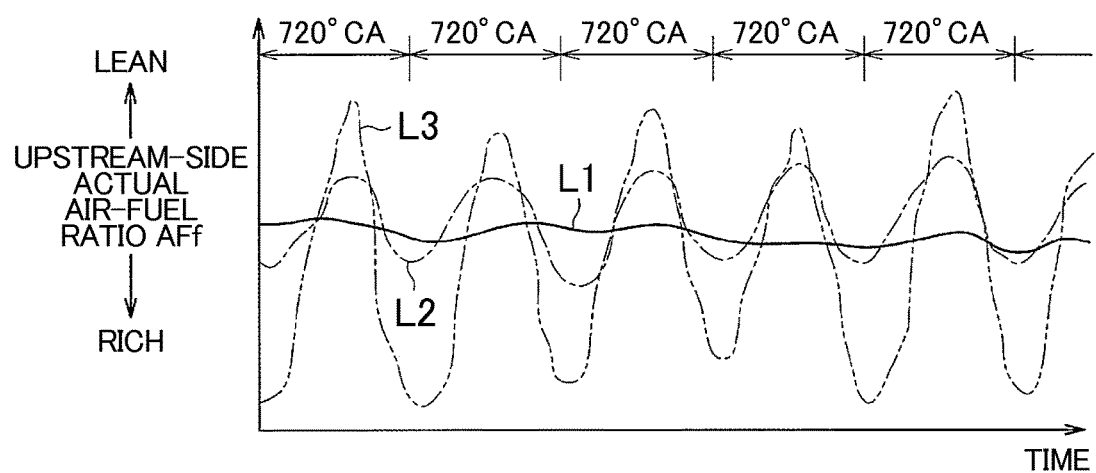
FIG. 3 is a time chart that shows a change in air-fuel ratio fluctuations in response to the degree of cylinder-to-cylinder variations in the internal combustion engine.

FIG. 3 shows fluctuations in air-fuel ratio in one cycle (720° C.A) in which combustion takes a round in all the cylinders of a four-cylinder engine, and shows the mode of fluctuations in the upstream-side actual air-fuel ratio AFf that is detected by the upstream-side sensor 35 particularly when cylinder-to-cylinder variations in fuel injection amount are caused to occur by intentionally changing the fuel injection amount of a certain one of the cylinders. The continuous line L1 shown in FIG. 3 indicates fluctuations in upstream-side actual air-fuel ratio AFf at the time when there are no cylinder-to-cylinder variations. The alternate long and short dashed line L2 indicates fluctuations in upstream-side actual air-fuel ratio AFf at the time when cylinder-to-cylinder variations are caused to occur by changing the fuel injection amount of a certain one of the cylinders by a predetermined amount A1. The alternate long and two-short dashed line L3 indicates fluctuations in upstream-side actual air-fuel ratio AFf at the time when cylinder-to-cylinder variations are caused to occur by changing the fuel injection amount of a certain one of the cylinders by a predetermined amount A2 larger than the predetermined amount A1.

As indicated by the continuous line L1 in FIG. 3, the upstream-side actual air-fuel ratio AFf repeats periodical fluctuations at a period of one cycle of the internal combustion engine 11. As indicated by the alternate long and short dashed line L2, when there occur cylinder-to-cylinder variations in fuel injection amount and, as a result, there arises a difference in air-fuel ratio among the cylinders, the amount of fluctuations in upstream-side actual air-fuel ratio AFf within one cycle increases. As indicated by the alternate long and short dashed line L2 and the alternate long and two-short dashed line L3, as a deviation in fuel injection amount among the cylinders increases, that is, as the degree of cylinder-to-cylinder variations in fuel injection amount increases, the amount of fluctuations in upstream-side actual air-fuel ratio AFf increases.

In the present embodiment, the imbalance ratio IMB that indicates the degree of the cylinder-to-cylinder variations is detected on the basis of a value that correlates with the amount of fluctuations in upstream-side actual air-fuel ratio AFf (for example, the slope of the signal that is output from the upstream-side sensor 35, the rate of change in upstream-side actual air-fuel ratio AFf, the amount of change in upstream-side actual air-fuel ratio AFf within a predetermined period, or the like). More specifically, the above-described value associated with the amount of fluctuations in upstream-side actual air-fuel ratio AFf is detected, and, on the basis of the detected value, the imbalance ratio IMB is increased as the amount of fluctuations increases.

In the present embodiment, in order to increase the accuracy of the imbalance ratio IMB, in operation states other than sudden acceleration or sudden deceleration, the imbalance ratio IMB is detected multiple times, and a final imbalance ratio IMB is calculated by averaging the detected multiple imbalance ratios IMB. Calculation of a final imbalance ratio IMB by averaging is one example, and a final imbalance ratio IMB may be calculated in another mode.

The internal combustion engine 11 according to the present embodiment includes the port injectors 22 and the in-cylinder injectors 17. Therefore, a port imbalance ratio IMBp and an in-cylinder imbalance ratio IMBd each are detected as the imbalance ratio IMB. The port imbalance ratio IMBp indicates the degree of cylinder-to-cylinder variations in the amount of fuel that is injected from the port injectors 22. The in-cylinder imbalance ratio IMBd indicates the degree of cylinder-to-cylinder variations in the amount of fuel that is injected from the in-cylinder injectors 17.

The port imbalance ratio IMBp is desirably detected while only the port injection is being carried out. When both the port injection and the in-cylinder injection are being carried out, for example, the port imbalance ratio IMBp may be detected by correcting the imbalance ratio IMB, detected while both are being carried out, in response to the port injection ratio Rp. Similarly, the in-cylinder imbalance ratio IMBd is also desirably detected while only the in-cylinder injection is being carried out. When both the port injection and the in-cylinder injection are being carried out, for example, the in-cylinder imbalance ratio IMBd may be detected by correcting the imbalance ratio IMB, detected while both are being carried out, in response to the in-cylinder injection ratio Rd.

The technique for detecting the degree of the cylinder-to-cylinder variations is already known. For example, other than the above-described amount of fluctuations in upstream-side actual air-fuel ratio AFf, it is known that fluctuations in the rotation of the internal combustion engine increase as the degree of the cylinder-to-cylinder variations increases. It is also known that the concentration of hydrogen that is emitted from the cylinders increases as the air-fuel ratio of part of the cylinders deviates to the rich side with respect to the air-fuel ratios of the other cylinders. It is further known that, when the concentration of hydrogen increases in this way, the sensor that detects the air-fuel ratio detects hydrogen and, as a result, the output value of the sensor deviates to the rich side with respect to the output value corresponding to the actual air-fuel ratio. Therefore, the degree of the cylinder-to-cylinder variations may be detected by using such a known technique.

The controller 30 executes air-fuel ratio control over the internal combustion engine 11 in the following mode. In the air-fuel ratio control according to the present embodiment, the stoichiometric air-fuel ratio is set as a target air-fuel ratio. This air-fuel ratio control is composed of main feedback correction and sub-feedback correction. In the main feedback correction, the fuel injection amount is corrected such that the output value V1 of the upstream-side sensor 35 becomes an output value corresponding to the target air-fuel ratio. In the sub-feedback correction, the fuel injection amount corrected in the main feedback correction is corrected such that the output value V2 of the downstream-side sensor 36 becomes an output value corresponding to the target air-fuel ratio. The output value corresponding to the target air-fuel ratio in the main feedback correction means the output value V1 of the upstream-side sensor 35 at the time when the upstream-side actual air-fuel ratio AFf coincides with the target air-fuel ratio of the upstream-side actual air-fuel ratio AFf. Similarly, the output value corresponding to the target air-fuel ratio in the sub-feedback correction means the output value V2 of the downstream-side sensor 36 at the time when the downstream-side actual air-fuel ratio AFr coincides with the target air-fuel ratio of the downstream-side actual air-fuel ratio AFr.

The fuel injection amount Q that is the total amount of fuel that is injected from the port injectors 22 and the in-cylinder injectors 17 is calculated by using the following mathematical expression on the basis of a base fuel injection amount Qb and a main correction value ME.

$$Q = Qb + MF \quad (1)$$

Q: fuel injection amount Q; Qb: base fuel injection amount; MF: main correction value The base fuel injection amount Qb is a theoretical fuel injection amount required to obtain air-fuel mixture having the stoichiometric air-fuel ratio, and is calculated on the basis of the engine rotation speed NE and the engine load KL.

The main correction value MF is a value that is calculated by the main feedback correction, and is obtained by using the following mathematical expression (2).

$$MF = DF + MG \quad (2)$$

MF: main correction value; DF: main instantaneous correction value; MG: main learning value
The main instantaneous correction value DF is increased or reduced on the basis of a current deviation between the output value V1 of the upstream-side sensor 35 and the output value corresponding to the target air-fuel ratio (in the present embodiment, the output value at the time when the actual air-fuel ratio becomes the stoichiometric air-fuel ratio). By increasing or reducing the main instantaneous correction value DF, the fuel injection amount Q is quickly increased or reduced in response to the current deviation between the upstream-side actual air-fuel ratio AFf and the target air-fuel ratio.

The main learning value MG is updated with a value that compensates for a steady deviation of the upstream-side actual air-fuel ratio AFf with respect to the target air-fuel ratio. The main learning value MG is updated by temporally integrating the deviation between the output value V1 of the upstream-side sensor 35 and the output value corresponding to the target air-fuel ratio.

As is apparent from the mathematical expression (1) and the mathematical expression (2), the fuel injection amount Q reflects the main instantaneous correction value DF and the main learning value MG that are calculated in the above-described mode. Thus, the fuel injection amount of the internal combustion engine 11 is adjusted such that the upstream-side actual air-fuel ratio AFf of the internal combustion engine 11 becomes the target air-fuel ratio.

Incidentally, in order to fully exercise the exhaust gas purification performance of the catalyst 100, it is desirable to set the concentration of oxygen in exhaust gas passing through the catalyst 100 to a value corresponding to the concentration of oxygen at the time of combustion of air-fuel mixture having the stoichiometric air-fuel ratio. A sub-correction value SB is calculated by the sub-feedback correction on the basis of the output of the downstream-side sensor 36 provided downstream of the catalyst 100. As expressed by the following mathematical expression (3), the output value V1 is corrected by adding the sub-correction value SB to the output value V1 of the upstream-side sensor 35.

$$V1 \leftarrow \text{Latest}V1 + SB \quad (3)$$

V1: output value of the upstream-side sensor; SB: sub-correction value The fact that the output value V1 of the upstream-side sensor 35 is corrected by using the sub-correction value SB means that the main correction value MF that is obtained on the basis of the output value V1 of the upstream-side sensor 35, and the like, is corrected by using the sub-correction value SB. Therefore, the sub-correction value SB is a correction value for correcting the fuel injection amount corrected by the main feedback correction such that the output value V2 of the downstream-side sensor 36 becomes the output value corresponding to the target air-fuel ratio.

The sub-correction value SB is obtained from the following mathematical expression (4).

$$SB \leftarrow VH + SB \quad (4)$$

SB: sub-correction value; VH: sub-instantaneous correction value; SG: sub-learning value The sub-instantaneous correction value VH is increased or reduced on the basis of a current deviation between the output value V2 of the downstream-side sensor 36 and the output value corresponding to the target air-fuel ratio (in the present embodiment, the output value at the time when the actual air-fuel ratio becomes the stoichiometric air-fuel ratio). By correcting the output value V1 of the upstream-side sensor 35 through an increase or reduction of the sub-instantaneous correction value VH, the fuel injection amount Q is quickly corrected in response to the current deviation between the downstream-side actual air-fuel ratio AFr and the target air-fuel ratio.

The sub-learning value SG is a value that compensates for a steady deviation between the output value V2 of the downstream-side sensor 36 and the output value corresponding to the target air-fuel ratio, for example, a steady deviation that occurs because of the degradation of the catalyst 100, or the like, and is updated by temporally integrating the deviation between the output value V2 of the downstream-side sensor 36 and the output value corresponding to the target air-fuel ratio.

Incidentally, as described above, when there occur cylinder-to-cylinder variations, the upstream-side sensor 35 detects hydrogen because of a high concentration of hydrogen that is emitted from the cylinders, with the result that the output value V1 of the upstream-side sensor 35 deviates to the rich side with respect to the output value corresponding to the upstream-side actual air-fuel ratio AFf. When the output value V1 of the upstream-side sensor 35 deviates to the rich side in this way, the upstream-side actual air-fuel ratio AFf is erroneously corrected to the lean side with respect to the target air-fuel ratio by the main feedback correction in the air-fuel ratio control, with the result that the exhaust gas purification performance of the catalyst 100 decreases. On the other hand, hydrogen contained in exhaust gas is oxidized as the hydrogen passes through the catalyst 100. Therefore, the output value V2 of the downstream-side sensor 36, different from the output value V1 of the upstream-side sensor 35, becomes a proper output value corresponding to the actual air-fuel ratio. Therefore, for the above reason, even when the upstream-side actual air-fuel ratio AFf is erroneously corrected to the lean side with respect to the target air-fuel ratio, the downstream-side sensor 36 properly detects the downstream-side actual air-fuel ratio AFr, and the output value V2 indicates a lean air-fuel ratio.

Therefore, the actual air-fuel ratio erroneously corrected to the lean side by the main feedback correction is properly detected by the downstream-side sensor 36, and, in the sub-feedback correction, the sub-correction value SB for increasing the fuel injection amount is calculated in order to correct the downstream-side actual air-fuel ratio AFr indicating a lean air-fuel ratio to the rich side. With the thus calculated sub-correction value SB, a lean deviation of the upstream-side actual air-fuel ratio AFf with respect to the target air-fuel ratio due to a deviation of the output value of the upstream-side sensor 35 is gradually suppressed.

On the other hand, a lean deviation of the upstream-side actual air-fuel ratio AFf due to a deviation of the output value V1 of the upstream-side sensor 35 at the time when there are cylinder-to-cylinder variations can also be suppressed by further increasing the fuel injection amount Q that is corrected in the air-fuel ratio control. In the present embodiment, the following stoichiometric correction is carried out as one example of the process of increasing the fuel injection amount Q such that the air-fuel ratio of exhaust gas flowing into the catalyst 100 becomes the stoichiometric air-fuel ratio by suppressing erroneous correction of the air-fuel ratio due to a deviation of the output value V1 of the upstream-side sensor 35 due to the above-described cylinder-to-cylinder variations.

In this stoichiometric correction, when a stoichiometric correction value SH for correcting the target air-fuel ratio of the upstream-side actual air-fuel ratio AFf to the rich side is calculated and then the target air-fuel ratio of the upstream-side actual air-fuel ratio AFf is corrected to the rich side by the stoichiometric correction value SH, the fuel injection amount Q that is corrected in the air-fuel ratio control is increased as compared to that before the target air-fuel ratio is corrected to the rich side. By further increasing the fuel injection amount Q, the upstream-side actual air-fuel ratio AFf changes to the rich side, and the air-fuel ratio of exhaust gas flowing into the catalyst 100 is adjusted to the stoichiometric air-fuel ratio. In this way, the stoichiometric correction value SH is a value that corrects the target air-fuel ratio of the upstream-side actual air-fuel ratio AFf to the rich side. The stoichiometric correction value SH is a correction value required to set the atmosphere of the catalyst 100, which becomes lean because of a deviation of the output value V1 of the upstream-side sensor 35, to the stoichiometric air-fuel ratio. This stoichiometric correction corresponds to "the process of further correcting the fuel injection amount that is corrected through the air-fuel ratio control at the time when there are cylinder-to-cylinder variations in the fuel injection amount that is injected from the fuel injection valves", and the stoichiometric correction value SH corresponds to a correction value that is set in the process of correcting the fuel injection amount.

Figure 4:
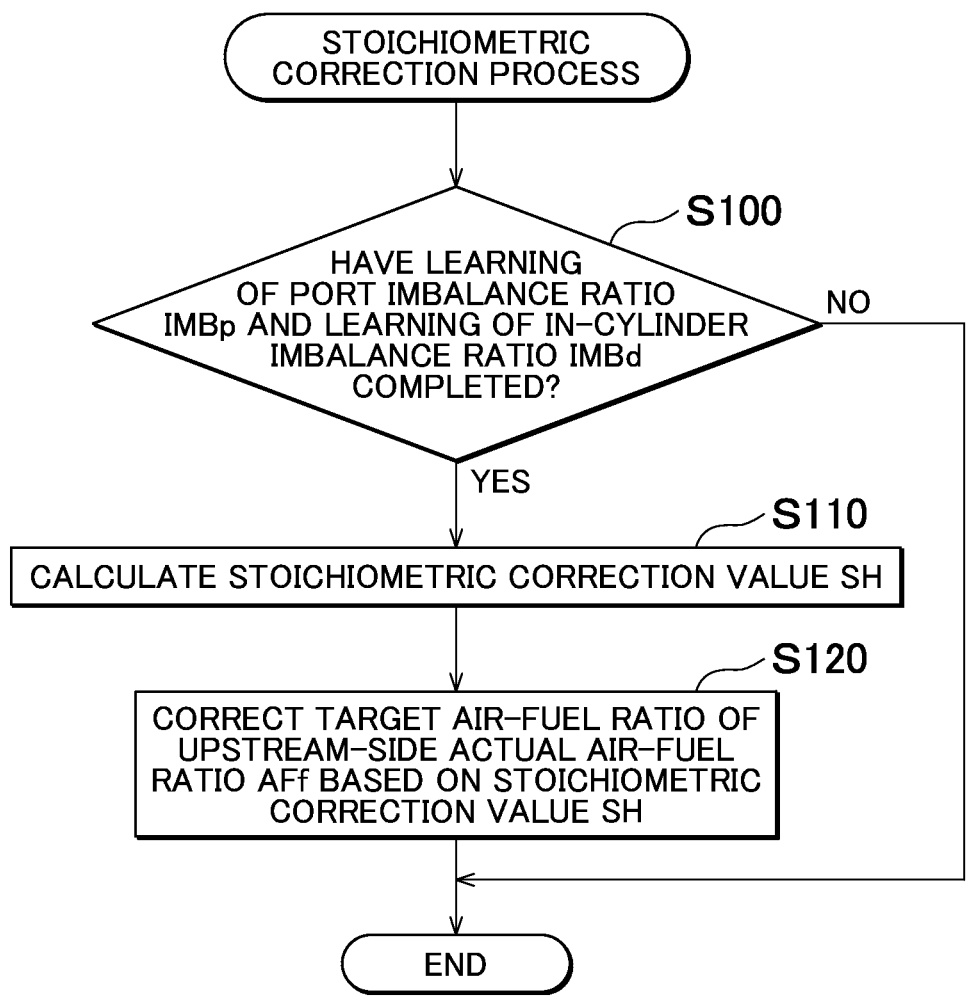
FIG. 4 is a flowchart that shows the procedure of stoichiometric correction in control over the internal combustion engine.

FIG. 4 shows an example of the procedure of such stoichiometric correction. The process is repeatedly executed by the controller 30 at predetermined intervals. As the process is started, it is initially determined whether both learning of the port imbalance ratio IMBp and learning of the in-cylinder imbalance ratio IMBd have completed (S100). Completion of learning of the port imbalance ratio IMBp means the state where averaging of the port imbalance ratios IMBp detected multiple times has completed as described above. Similarly, completion of learning of the in-cylinder imbalance ratio IMBd also means the state where averaging of the in-cylinder imbalance ratios IMBd detected multiple times has completed as described above.

When either learning of the port imbalance ratio IMBp or learning of the in-cylinder imbalance ratio IMBd has not completed (NO in S100), the process is once ended. On the other hand, when both learning of the port imbalance ratio IMBp and learning of the in-cylinder imbalance ratio IMBd have completed (YES in S100), the stoichiometric correction value SH is calculated (S110). As described above, the stoichiometric correction value SH is a value for correcting the target air-fuel ratio to the rich side and is a correction value for setting the atmosphere of the catalyst 100, which becomes lean because of a deviation of the output value V1 of the upstream-side sensor 35, to the stoichiometric air-fuel ratio. As the stoichiometric correction value SH increases, the amount of increase in fuel injection amount increases. As the degree of the cylinder-to-cylinder variations increases, a deviation of the output value V1 of the upstream-side sensor 35 increases, so the amount of deviation of the upstream-side actual air-fuel ratio AFf to the lean side also increases. The stoichiometric correction value SH changes in response to the degree of the cylinder-to-cylinder variations.

Figure 5:
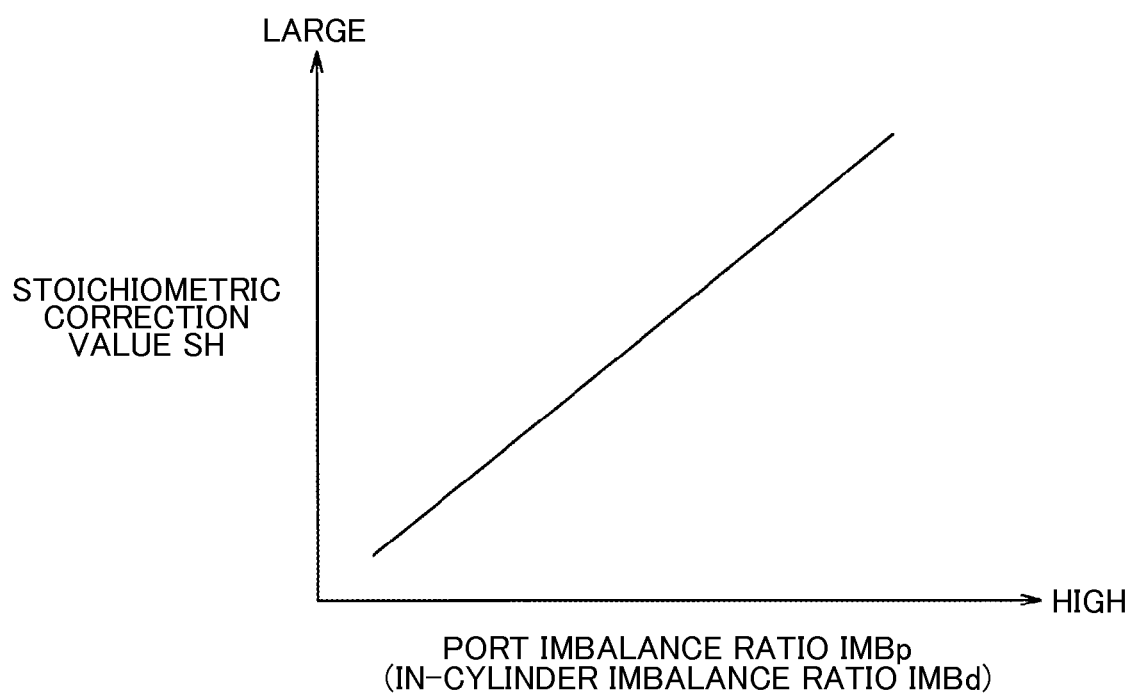
FIG. 5 is a conceptual graph that shows the correlation between a stoichiometric correction value in control over the internal combustion engine and an imbalance ratio that is an index value indicating cylinder-to-cylinder variations in fuel injection amount.

As shown in FIG. 5, the stoichiometric correction value SH is set to a larger value as the port imbalance ratio IMBp increases or as the in-cylinder imbalance ratio IMBd increases. Thus, as the degree of the cylinder-to-cylinder variations increases, the amount of increase in fuel injection amount by the stoichiometric correction is increased.

Even when the degree of the cylinder-to-cylinder variations is the same but when the engine load or the engine rotation speed varies, the influence of the concentration of hydrogen contained in exhaust gas on the output value V1 of the upstream-side sensor 35 varies. Therefore, a deviation of the output value V1 of the upstream-side sensor 35 due to the cylinder-to-cylinder variations varies. In order to further accurately set the correction value, the stoichiometric correction value SH is variably set commensurately with not only the degree of the cylinder-to-cylinder variations but also the engine load or the engine rotation speed. In addition, the influence of the degree of the cylinder-to-cylinder variations on a deviation of the output value V1 of the upstream-side sensor 35 also changes depending on the injection ratio between the port injectors 22 and the in-cylinder injectors 17. The stoichiometric correction value SH that is set on the basis of the parameters is corrected in response to the port injection ratio Rp or the in-cylinder injection ratio Rd. Thus, a final value is calculated.

As described above, the output value V2 of the downstream-side sensor 36 reflects the actual atmosphere of the catalyst 100 without any influence of the concentration of hydrogen emitted from the cylinders. Therefore, the stoichiometric correction value SH may be variably set in response to the output value V2 of the downstream-side sensor 36. In this case as well, the stoichiometric correction value SH can be calculated as a correction value required to set the atmosphere of the catalyst 100, which becomes lean because of a deviation of the output value V1 of the upstream-side sensor 35, to the stoichiometric air-fuel ratio. Other than this, as described above, a deviation of the output value V1 of the upstream-side sensor 35 changes in response to the concentration of hydrogen that is emitted from the cylinders. A sensor that detects the concentration of hydrogen emitted from the cylinders is provided upstream of the catalyst 100. The stoichiometric correction value SH may be set on the basis of the concentration of hydrogen, which is detected by the sensor. In this case as well, the stoichiometric correction value SH can be calculated as a correction value required to set the atmosphere of the catalyst 100, which becomes lean because of a deviation of the output value V1 of the upstream-side sensor 35, to the stoichiometric air-fuel ratio.

In step S110, when the stoichiometric correction value SH is calculated, the target air-fuel ratio of the upstream-side actual air-fuel ratio AFf is corrected on the basis of the stoichiometric correction value SH (S120), and then the process is once ended. In step S120, the target air-fuel ratio of the upstream-side actual air-fuel ratio AFf is corrected to the rich side by correcting the target air-fuel ratio of the currently set upstream-side actual air-fuel ratio AFf by using the stoichiometric correction value SH. In step S120, as the stoichiometric correction value SH increases, the amount of correction of the target air-fuel ratio to the rich side increases. When the target air-fuel ratio of the upstream-side actual air-fuel ratio AFf is corrected to the rich side, the fuel injection amount Q is increased such that the upstream-side actual air-fuel ratio AFf becomes richer than that before the target air-fuel ratio is corrected to the rich side. Therefore, the atmosphere of the catalyst 100, which becomes lean because of a deviation of the output value V1 of the upstream-side sensor 35, changes to the atmosphere of the stoichiometric air-fuel ratio.

The fuel injection amount Q may be increased in a mode different from the mode in which the target air-fuel ratio is corrected by using the stoichiometric correction value SH. For example, the target air-fuel ratio for setting the atmosphere of the catalyst 100 to the atmosphere of the stoichiometric air-fuel ratio is set in form of a map, or the like, in advance on the basis of the degree of the cylinder-to-cylinder variations, the engine load KL and the engine rotation speed NE. The target air-fuel ratio set in this way may be utilized in the air-fuel ratio control. The fuel injection amount Q corrected through the air-fuel ratio control may be directly increased by using the stoichiometric correction value SH.

Incidentally, the upstream-side actual air-fuel ratio AFf becomes rich as a result of an increase in the fuel injection amount Q through correction of the target air-fuel ratio by using the stoichiometric correction value SH. Therefore, after enrichment of the upstream-side actual air-fuel ratio AFf is started by using the stoichiometric correction value SH, that is, after learning of the port imbalance ratio IMBp and learning of the in-cylinder imbalance ratio IMBd have completed and then the stoichiometric correction value SH is calculated, a steady deviation between the output value V2 of the downstream-side sensor 36 and the output value corresponding to the target air-fuel ratio of the downstream-side actual air-fuel ratio AFr decreases. Therefore, the sub-learning value SG that constitutes the sub-correction value SB gradually decreases, and converges to an appropriate value.

Until enrichment of the upstream-side actual air-fuel ratio AFf is started by using the stoichiometric correction value SH, enrichment of the upstream-side actual air-fuel ratio AFf is achieved by using the sub-correction value SB, and the sub-learning value SG that compensates for a steady deviation between the output value V2 of the downstream-side sensor 36 and the output value corresponding to the target air-fuel ratio of the downstream-side actual air-fuel ratio AFr is a relatively large value. Therefore, just after enrichment of the upstream-side actual air-fuel ratio AFf is started by using the stoichiometric correction value SH in the state where the sub-learning value SG is a relatively large value, the fuel injection amount Q is excessively increased, with the result that there is a possibility that the upstream-side actual air-fuel ratio AFf becomes excessively rich. Such an excessively rich upstream-side actual air-fuel ratio AFf is eliminated as the sub-learning value SG of the sub-correction value SB gradually decreases and converges to an appropriate value. However, it takes a certain time for the sub-learning value SG to converge to an appropriate value. Therefore, there is a concern that the exhaust gas purification performance decreases until the sub-learning value SG converges to an appropriate value.

In the present embodiment, by executing the process of changing the sub-learning value, which will be described below, a time required until the sub-learning value SG gradually decreases and converges to an appropriate value is reduced, thus suppressing the deterioration of the exhaust gas purification performance.

Figure 6:
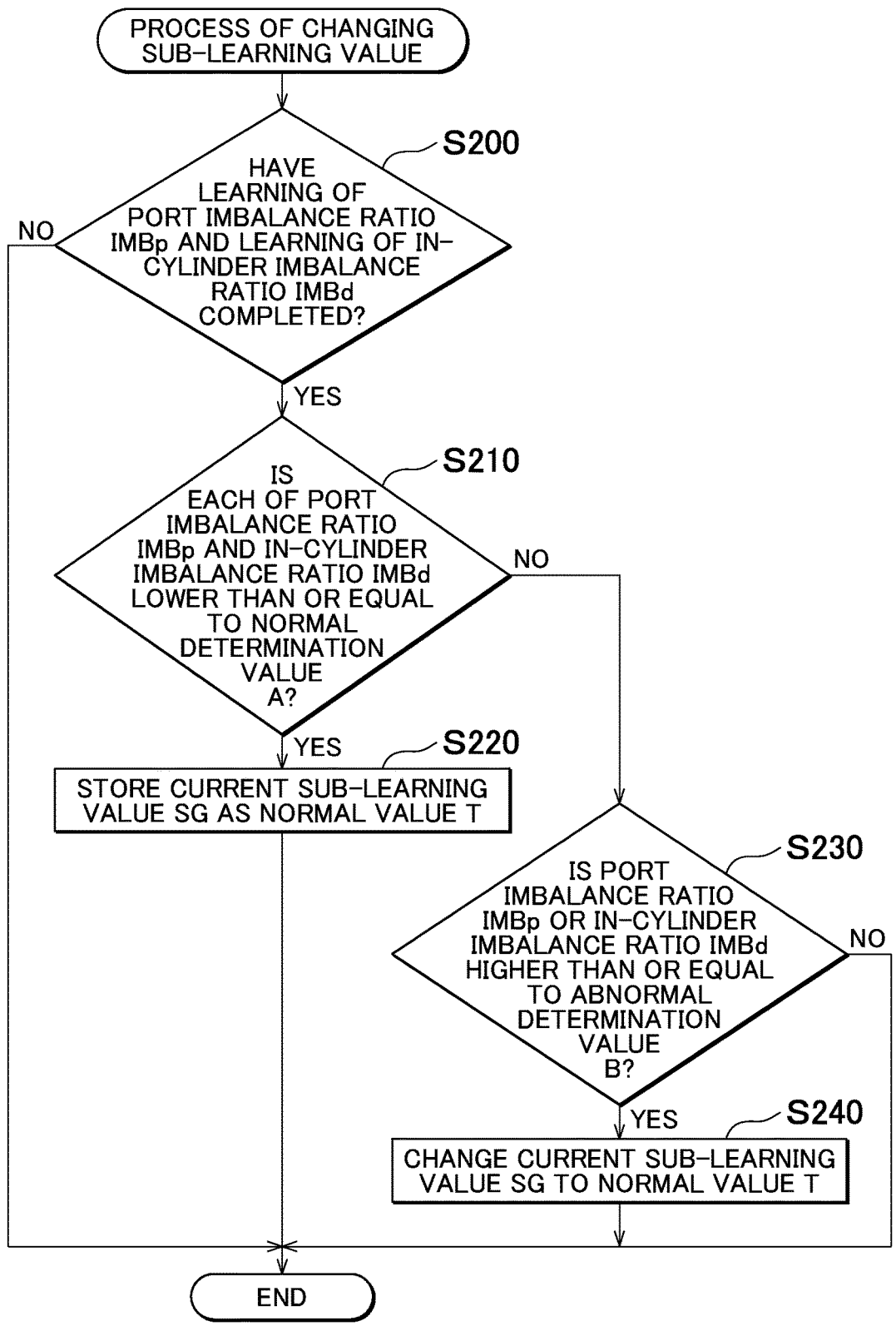
FIG. 6 is a flowchart that shows the procedure of the process of changing a sub-learning value in the controller according to the embodiment.

Hereinafter, the process of changing the sub-learning value will be described with reference to FIG. 6. The process is repeatedly executed by the controller 30 at predetermined intervals. As shown in FIG. 6, as the process is started, it is initially determined whether both learning of the port imbalance ratio IMBp and learning of the in-cylinder imbalance ratio IMBd have completed (S200). Completion of learning of the port imbalance ratio IMBp means the state where averaging of the port imbalance ratios IMBp detected multiple times has completed as described above. Similarly, completion of learning of the in-cylinder imbalance ratio IMBd also means the state where averaging of the in-cylinder imbalance ratios IMBd detected multiple times has completed as described above.

When either learning of the port imbalance ratio IMBp or learning of the in-cylinder imbalance ratio IMBd has not completed (NO in S200), the process is once ended. On the other hand, when both learning of the port imbalance ratio IMBp and learning of the in-cylinder imbalance ratio IMBd have completed (YES in S200), it is determined whether each of the port imbalance ratio IMBp and the in-cylinder imbalance ratio IMBd is lower than or equal to a normal determination value A (S210). The normal determination value A is a value for determining that there is no abnormality in the cylinder-to-cylinder variations due to variations in fuel injection amount and the cylinder-to-cylinder variations fall within a normal range. When the port imbalance ratio IMBp is lower than or equal to the normal determination value A, it is determined that there is no abnormality in cylinder-to-cylinder variations in the amount of fuel that is injected from the port injectors 22 and the cylinder-to-cylinder variations are normal. Similarly, when the in-cylinder imbalance ratio IMBd is lower than or equal to the normal determination value A, it is determined that there is no abnormality in cylinder-to-cylinder variations in the amount of fuel that is injected from the in-cylinder injectors 17 and the cylinder-to-cylinder variations are normal.

When each of the port imbalance ratio IMBp and the in-cylinder imbalance ratio IMBd is lower than or equal to the normal determination value A (YES in S210), the currently set sub-learning value SG is stored in the nonvolatile memory of the controller 30 as a normal value T (S220), and then the process is once ended. Hereinafter, the process is executed at the predetermined intervals and each time affirmative determination is made in step S200 and step S210, that is, each time it is determined that there is no abnormality in both cylinder-to-cylinder variations associated with the port injectors 22 and cylinder-to-cylinder variations associated with the in-cylinder injectors 17, the normal value T stored in the nonvolatile memory is updated with the latest sub-learning value SG at that point in time.

On the other hand, when it is determined in step S210 that at least one of the port imbalance ratio IMBp or the in-cylinder imbalance ratio IMBd exceeds the normal determination value A (NO in S210), it is determined whether the port imbalance ratio IMBp or the in-cylinder imbalance ratio IMBd is higher than or equal to an abnormal determination value B (S230). The abnormal determination value B is a value for determining that there is an abnormality in the cylinder-to-cylinder variations due to variations in fuel injection amount. When the port imbalance ratio IMBp is higher than or equal to the abnormal determination value B, it is determined that there is an abnormality in cylinder-to-cylinder variations in the amount of fuel that is injected from the port injectors 22. Similarly, when the in-cylinder imbalance ratio IMBd is higher than or equal to the abnormal determination value B, it is determined that there is an abnormality in cylinder-to-cylinder variations in the amount of fuel that is injected from the in-cylinder injectors 17.

Determination in step S210 or step S230 as to whether there is an abnormality in the cylinder-to-cylinder variations is carried out when both learning of the port imbalance ratio IMBp and learning of the in-cylinder imbalance ratio IMBd have completed. As described above, completion of learning of the port imbalance ratio IMBp or the in-cylinder imbalance ratio IMBd means the state where averaging of the imbalance ratios detected multiple times has completed. Therefore, a certain time is required until such learning of the port imbalance ratio IMBp or learning of the in-cylinder imbalance ratio IMBd completes, and determination in step S210 or step S230 as to whether there is an abnormality in the cylinder-to-cylinder variations is carried out at least after a lapse of a predetermined period required for learning of the imbalance ratio to complete. After learning of the imbalance ratio has completed, it is determined whether there is an abnormality in the cylinder-to-cylinder variations at appropriate intervals, such as each one trip (an interval from when the engine is started up to when the engine is stopped thereafter) and each time a predetermined time elapses.

When it is determined in step S230 that neither the port imbalance ratio IMBp nor the in-cylinder imbalance ratio IMBd is higher than or equal to the abnormal determination value B, that is, when each of the port imbalance ratio IMBp and the in-cylinder imbalance ratio IMBd is lower than the abnormal determination value B (NO in S230), the process is once ended.

On the other hand, when it is determined that either the port imbalance ratio IMBp or the in-cylinder imbalance ratio IMBd is higher than or equal to the abnormal determination value B (YES in S230), the currently set sub-learning value SG is changed to the latest normal value T stored in the nonvolatile memory (S240), and then the process is once ended.

According to the above-described embodiment, the following operation and advantageous effects are obtained.

(1) When it is determined that there is no abnormality in both cylinder-to-cylinder variations associated with the port injectors 22 and cylinder-to-cylinder variations associated with the in-cylinder injectors 17, the above-described deviation of the output value V1 of the upstream-side sensor 35 decreases, so a lean deviation of the upstream-side actual air-fuel ratio AFf due to the deviation of the output value V1 is suppressed. Therefore, in this state, the output value V2 of the downstream-side sensor 36 is close to the output value corresponding to the target air-fuel ratio of the downstream-side actual air-fuel ratio AFr, and the sub-learning value SG that compensates for a steady deviation between the output value V2 of the downstream-side sensor 36 and the output value corresponding to the target air-fuel ratio (stoichiometric air-fuel ratio) of the downstream-side actual air-fuel ratio AFr is smaller than that in the case where there is an abnormality in the cylinder-to-cylinder variations.

In the above-described changing process, each time it is determined in step S210 that there is no abnormality in both cylinder-to-cylinder variations associated with the port injectors 22 and cylinder-to-cylinder variations associated with the in-cylinder injectors 17, the sub-learning value SG is stored as the normal value T in step S220 at the point in time at which it is determined that there is no abnormality. When it is determined in step S230 that there is an abnormality in cylinder-to-cylinder variations associated with at least any one set of the injectors, the sub-learning value SG set at that point in time is changed to the normal value T that is updated each time it is determined that there is no abnormality in the cylinder-to-cylinder variations (S240). Therefore, when it is determined in step S230 that there is an abnormality in cylinder-to-cylinder variations associated with at least any one set of the injectors, the sub-learning value SG set to a large value is changed to a small value. By quickly changing the sub-learning value SG from a large value to a small value in this way, a time required until the sub-learning value SG gradually decreases and converges to an appropriate value is reduced. Therefore, in the internal combustion engine 11 including the port injectors 22 and the in-cylinder injectors 17, it is possible to reduce a time required until the sub-learning value SG converges to an appropriate value, so it is possible to suppress the deterioration of exhaust gas purification performance at the time when there are cylinder-to-cylinder variations.

(2) When there are cylinder-to-cylinder variations, the above-described stoichiometric correction is executed as the process of further increasing the fuel injection amount Q that is corrected in the air-fuel ratio control. When it is determined that there is an abnormality in the cylinder-to-cylinder variations, the upstream-side actual air-fuel ratio AFf is enriched by using a value for increasing the fuel injection amount Q by the stoichiometric correction, that is, the stoichiometric correction value SH, and the sub-correction value SB including the sub-learning value SG changed from a large value to a small value.

Therefore, in comparison with the case where enrichment of the upstream-side actual air-fuel ratio AFf is started by using the stoichiometric correction value SH in the state where the sub-learning value SG is a relatively large value without any change, an excessive amount of increase in the fuel injection amount Q is suppressed by the amount by which the sub-learning value SG is changed to a small value. Therefore, it is possible to suppress excessive enrichment of the air-fuel ratio after enrichment of the upstream-side actual air-fuel ratio AFf is started by using the stoichiometric correction value SH. With this as well, it is possible to suppress the deterioration of exhaust gas purification performance at the time when there are cylinder-to-cylinder variations.

(3) Because it is possible to suppress the deterioration of exhaust gas purification performance at the time when there are cylinder-to-cylinder variations, in comparison with the case where it is not possible to suppress such deterioration, it is possible to set the abnormal determination value of the imbalance ratio IMB (more specifically, the abnormal determination value of the port imbalance ratio IMBp or the in-cylinder imbalance ratio IMBd) for determining that the exhaust gas purification performance is adversely influenced, to a higher value. Therefore, the difference between the normal imbalance ratio and the abnormal imbalance ratio becomes clear, so it is possible to increase abnormality determination accuracy for the port imbalance ratio IMBp or the in-cylinder imbalance ratio IMBd.

(4) As described above, because the difference between the normal imbalance ratio and the abnormal imbalance ratio becomes clear, it is possible to appropriately determine an abnormality of those imbalance ratios even when the responsiveness of the upstream-side sensor 35 that is used to detect the port imbalance ratio IMBp or the in-cylinder imbalance ratio IMBd is relatively low. Therefore, it is possible to suppress an increase in cost resulting from selecting and using the upstream-side sensor 35 having a high responsiveness, an increase in cost for increasing the responsiveness of the upstream-side sensor 35, and the like.

When the passage sectional area of the exhaust passage is narrowed, the flow rate of exhaust gas per unit time increases, so the responsiveness of the upstream-side sensor 35 increases. However, a pressure loss in the exhaust passage increases, so there is a concern that the engine output is adversely influenced. In this respect, according to the above-described embodiment, even when the responsiveness of the upstream-side sensor 35 is relatively low, it is possible to appropriately determine an abnormality of the imbalance ratio, so it is possible to also reduce the inconvenience caused by the narrowed passage sectional area of the exhaust passage.

In the changing process shown in FIG. 6 above, when it is determined in step S230 that there is an abnormality in cylinder-to-cylinder variations associated with the port injectors 22 or cylinder-to-cylinder variations associated with the in-cylinder injectors 17, the process of changing the sub-learning value SG to the normal value T is executed in step S240.

At this time, as the degree of the cylinder-to-cylinder variations increases, the deviation of the output value V1 of the upstream-side sensor 35 increases, with the result that the amount of deviation of the upstream-side actual air-fuel ratio AFf to the lean side also increases. In the above-described embodiment, the stoichiometric correction value SH is set to a larger value as the port imbalance ratio IMBp increases or as the in-cylinder imbalance ratio IMBd increases, with the result that the amount of increase in the fuel injection amount Q through the stoichiometric correction is increased as the degree of the cylinder-to-cylinder variations increases. When a change in the degree of the cylinder-to-cylinder variations is larger than or equal to a predetermined value, the stoichiometric correction value SH steeply increases, and the amount of increase in fuel injection amount Q steeply increases. Therefore, when the fuel injection amount Q is rapidly increased by using the stoichiometric correction value SH in the state where the sub-learning value SG is a relatively large value, there is a concern that the upstream-side actual air-fuel ratio AFf becomes excessively rich. In an alternative embodiment to the above-described embodiment, the sub-learning value SG may be changed to the normal value T in step S240 when it is determined that there is an abnormality in the cylinder-to-cylinder variations and when a change in the degree of the cylinder-to-cylinder variations is larger than or equal to the predetermined value. Such control will be described below as a first alternative embodiment to the present embodiment.

Figure 7:
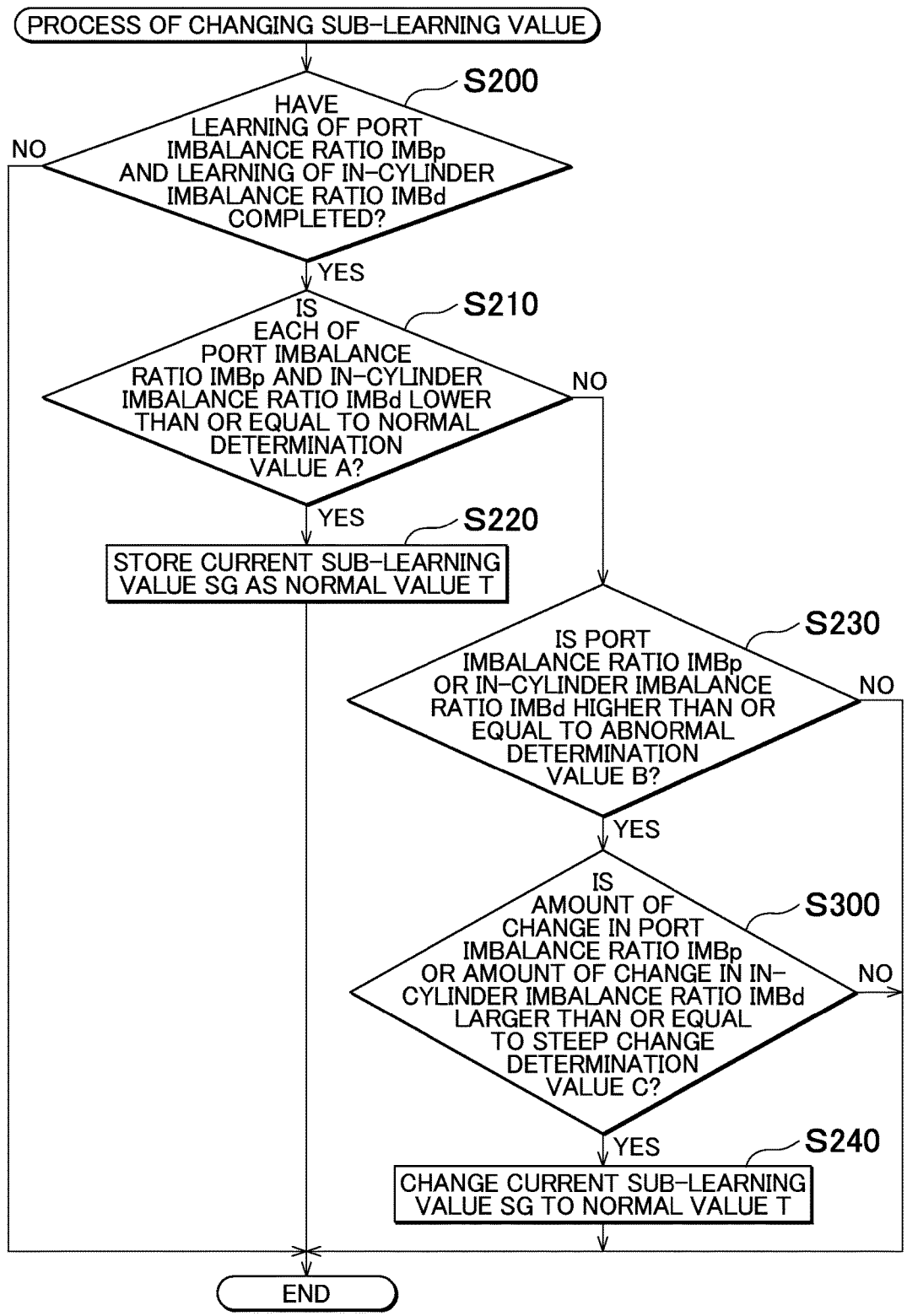
FIG. 7 is a flowchart that shows the procedure of the process of changing a sub-learning value in a first alternative embodiment to the embodiment.

FIG. 7 shows an example of the process of changing the sub-learning value SG according to the first alternative embodiment. In FIG. 7, like step numbers denote the same processes as the processes shown in FIG. 6 above. In the changing process according to this alternative embodiment, when it is determined in step S230 that the port imbalance ratio IMBp or the in-cylinder imbalance ratio IMBd is higher than or equal to the abnormal determination value B (YES in S230), it is determined whether the amount of change in port imbalance ratio IMBp or the amount of change in in-cylinder imbalance ratio IMBd is larger than or equal to a steep change determination value C (S300). The amount of change in port imbalance ratio IMBp is a value obtained by subtracting the port imbalance ratio IMBp at the time when the process is previously executed from the port imbalance ratio IMBp at the time when the process is currently executed. Similarly, the amount of change in in-cylinder imbalance ratio IMBd is a value obtained by subtracting the in-cylinder imbalance ratio IMBd at the time when the process is previously executed from the in-cylinder imbalance ratio IMBd at the time when the process is currently executed. The steep change determination value C is a value for determining that the degree of the cylinder-to-cylinder variations has steeply increased. When the amount of change in port imbalance ratio IMBp is larger than or equal to the steep change determination value C, it is determined that a change in the degree of cylinder-to-cylinder variations in the amount of fuel that is injected from the port injectors 22 is large. Similarly, when the amount of change in in-cylinder imbalance ratio IMBd is larger than or equal to the steep change determination value C, it is determined that a change in the degree of cylinder-to-cylinder variations in the amount of fuel that is injected from the in-cylinder injectors 17 is large.

When either the amount of change in port imbalance ratio IMBp or the amount of change in in-cylinder imbalance ratio IMBd is not larger than or equal to the steep change determination value C, that is, when both the amount of change in port imbalance ratio IMBp and the amount of change in in-cylinder imbalance ratio IMBd are smaller than the steep change determination value C (NO in S300), the process is once ended.

On the other hand, when the amount of change in port imbalance ratio IMBp or the amount of change in in-cylinder imbalance ratio IMBd is larger than or equal to the steep change determination value C (YES in S300), the currently set sub-learning value SG is changed to the latest normal value T stored in the nonvolatile memory (S240), and then the process is once ended.

According to the above alternative embodiment, when there is an abnormality in any one of cylinder-to-cylinder variations associated with the port injector 22 or cylinder-to-cylinder variations associated with the in-cylinder injectors 17 and a change in the degree of the cylinder-to-cylinder variations is large, the sub-learning value SG is changed to a small value. That is, in the state where the sub-learning value SG is a relatively large value, when there is a concern that the fuel injection amount is steeply increased by using the stoichiometric correction value SH that is set to a further relatively large value, the sub-learning value SG is changed to a small value. Therefore, it is possible to suppress excessive enrichment of the above-described upstream-side actual air-fuel ratio AFf.

In the above-described embodiment, the process of changing the sub-learning value SG is described by way of an example in which the changing process is executed in the internal combustion engine 11 including the port injectors 22 and the in-cylinder injectors 17. Other than this, the process of changing the sub-learning value SG described in the above-described embodiment or first alternative embodiment, the changing process may be executed in an internal combustion engine including only the port injectors 22 or an internal combustion engine including only the in-cylinder injectors 17.

Figure 8:
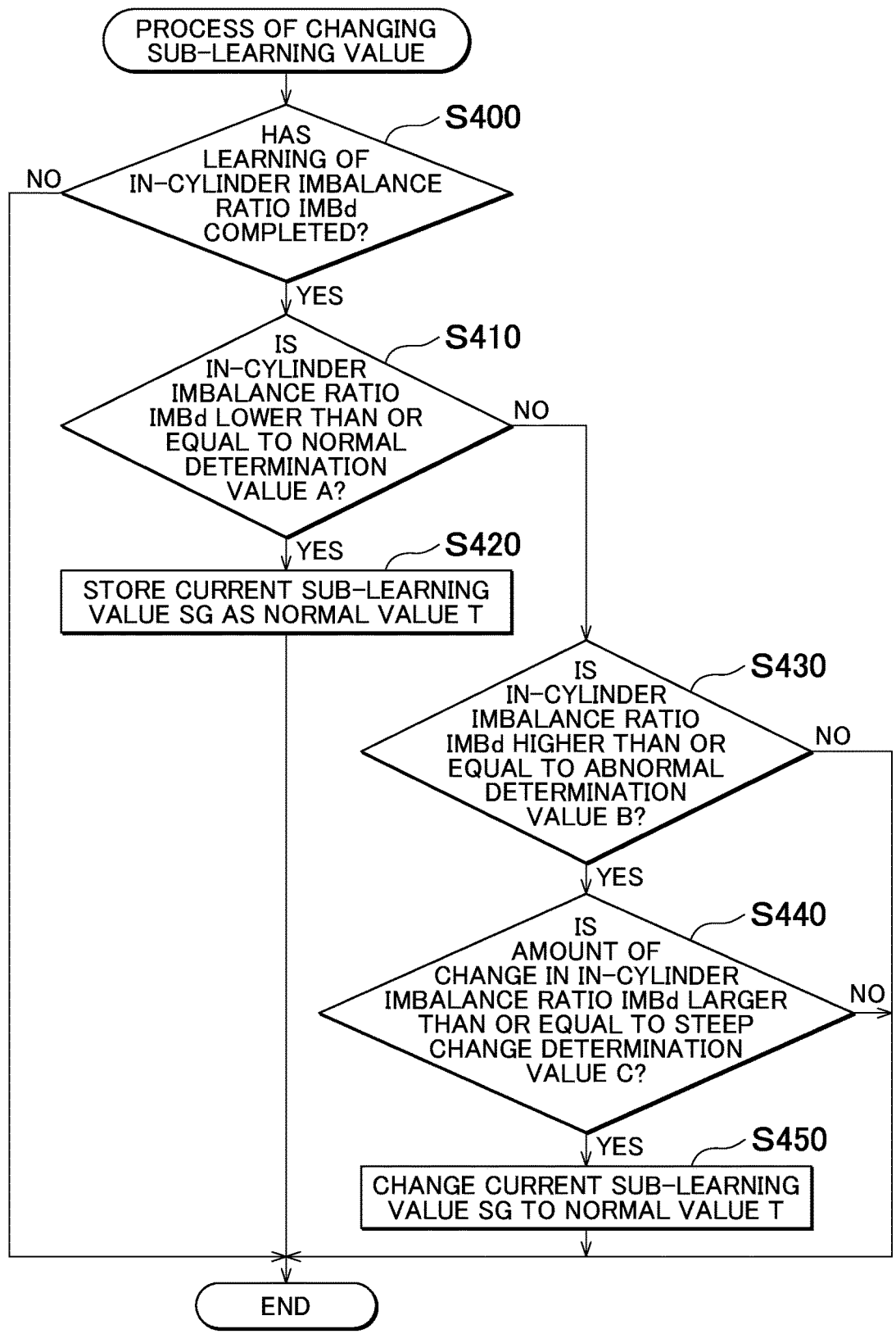
FIG. 8 is a flowchart that shows the procedure of the process of changing a sub-learning value in a second alternative embodiment to the embodiment.

In a second alternative embodiment to the present embodiment, the procedure of executing the process of changing the sub-learning value SG in the internal combustion engine including only the in-cylinder injectors 17 is shown in FIG. 8. In the case of the internal combustion engine including only the in-cylinder injectors 17, only the in-cylinder imbalance ratio IMBd is calculated. At the time of calculating the stoichiometric correction value SH, the process utilizing the above-described port imbalance ratio IMBp and the correction process utilizing the injection ratio are omitted.

As shown in FIG. 8, in the changing process in this alternative embodiment, in each of procedures shown in FIG. 7 above, determination associated with the port imbalance ratio IMBp is omitted, and only determination associated with the in-cylinder imbalance ratio IMBd is carried out.

More specifically, as the process is started, it is initially determined whether learning of the in-cylinder imbalance ratio IMBd has completed (S400). Completion of learning of the in-cylinder imbalance ratio IMBd means the state where averaging of the in-cylinder imbalance ratios IMBd detected multiple times has completed as described above.

When learning of the in-cylinder imbalance ratio IMBd has not completed (NO in S400), the process is once ended. On the other hand, when learning of the in-cylinder imbalance ratio IMBd has completed (YES in S400), it is determined whether the in-cylinder imbalance ratio IMBd is lower than or equal to the above-described normal determination value A (S410).

When the in-cylinder imbalance ratio IMBd is lower than or equal to the normal determination value A (YES in S410), the currently set sub-learning value SG is stored as the normal value T in the nonvolatile memory of the controller 30 (S420), and then the process is once ended. After that, the process is executed at the predetermined intervals, and each time affirmative determination is made in step S400 and step S410, that is, each time it is determined that there is no abnormality in cylinder-to-cylinder variations associated with the in-cylinder injectors 17, the normal value T stored in the nonvolatile memory is updated with the latest sub-learning value SG at that point in time.

On the other hand, when it is determined in step S410 that the in-cylinder imbalance ratio IMBd exceeds the normal determination value A (NO in S410), it is determined whether the in-cylinder imbalance ratio IMBd is higher than or equal to the above-described abnormal determination value B (S430). When it is determined that the in-cylinder imbalance ratio IMBd is not higher than or equal to the abnormal determination value B, that is, when the in-cylinder imbalance ratio IMBd is lower than the abnormal determination value B (NO in S430), the process is once ended.

On the other hand, when it is determined that the in-cylinder imbalance ratio IMBd is higher than or equal to the abnormal determination value B (YES in S430), it is determined whether the amount of change in in-cylinder imbalance ratio IMBd is larger than or equal to the above-described steep change determination value C (S440). The amount of change in in-cylinder imbalance ratio IMBd is a value obtained by subtracting the in-cylinder imbalance ratio IMBd at the time when the process is previously executed from the in-cylinder imbalance ratio IMBd at the time when the process is currently executed.

When the amount of change in in-cylinder imbalance ratio IMBd is not larger than or equal to the steep change determination value C, that is, when the amount of change in in-cylinder imbalance ratio IMBd is smaller than the steep change determination value C (NO in S440), the process is once ended.

On the other hand, when the amount of change in in-cylinder imbalance ratio IMBd is larger than or equal to the steep change determination value C (YES in S440), the currently set sub-learning value SG is changed to the latest normal value T stored in the nonvolatile memory (S450), and then the process is once ended.

According to the second alternative embodiment, in the internal combustion engine including only the in-cylinder injectors 17, operation and advantageous effects similar to the operation and advantageous effects obtained through the process of changing the sub-learning value, shown in FIG. 7 above, are obtained.

The process of step S440 shown in FIG. 8 may be omitted, and, it is determined in step S430 that the in-cylinder imbalance ratio IMBd is higher than or equal to the abnormal determination value B, the currently set sub-learning value SG may be changed to the latest normal value T stored in the nonvolatile memory by executing the process of step S450. In this case, in the internal combustion engine including only the in-cylinder injectors 17, operation and advantageous effects similar to the operation and advantageous effects obtained through the process of changing the sub-learning value, shown in FIG. 6 above, may be obtained.

Similarly, in the case of the internal combustion engine including only the port injectors 22, only the port imbalance ratio IMBp is calculated. At the time of calculating the stoichiometric correction value SH, the process utilizing the above-described in-cylinder imbalance ratio IMBd and the correction process utilizing the injection ratio are omitted. In each of the procedures shown in FIG. 6 or FIG. 7 above, determination associated with the in-cylinder imbalance ratio IMBd is omitted, and only determination associated with the port imbalance ratio IMBp is carried out. Thus, in the internal combustion engine including only the port injectors 22, operation and advantageous effects similar to the operation and advantageous effects obtained through the changing process of the sub-learning value, shown in FIG. 6 or FIG. 7 above, may be obtained.

The above-described stoichiometric correction value SH is a value for correcting the target value of the upstream-side actual air-fuel ratio AFf to the rich side, and is a correction value required to set the atmosphere of the catalyst 100, which becomes rich because of a deviation of the output value V1 of the upstream-side sensor 35, to the target air-fuel ratio (for example, the stoichiometric air-fuel ratio, or the like).

On the other hand, when the atmosphere of the catalyst 100 becomes rich because of a deviation of the output value V1 of the upstream-side sensor 35 at the time when there are cylinder-to-cylinder variations, the stoichiometric correction value SH should be changed to a value for correcting the target air-fuel ratio of the upstream-side actual air-fuel ratio AFf to the lean side in the above-described stoichiometric correction. In this case, because the fuel injection amount corrected in the air-fuel ratio control is reduced through the stoichiometric correction, so it is possible to set the atmosphere of the catalyst 100, which becomes rich because of a deviation of the output value V1 of the upstream-side sensor 35, to the target air-fuel ratio (for example, the stoichiometric air-fuel ratio, or the like). In this alternative embodiment as well, by executing the above-described process of changing the sub-learning value, operation and advantageous effects similar to those of the above-described embodiment may be obtained.

The downstream-side sensor 36 in the present embodiment may be an air-fuel ratio sensor similar to the upstream-side sensor 35.

The embodiment and first and second alternative embodiments described above are illustrative and not restrictive in all respects. The scope of the invention is defined by not only the above description but also the appended claims. The scope of the invention is intended to encompass all modifications within the scope of the appended claims and the meaning and scope of equivalents thereof.

What is claimed is:

1. A control apparatus for an internal combustion engine, the control apparatus comprising:
   a plurality of cylinders;
   fuel injection valves configured to inject fuel to each of the plurality of cylinders;
   a catalyst that is provided in an exhaust passage, the catalyst being configured to purify gas that is emitted from the internal combustion engine;
   an upstream-side sensor that is arranged upstream of the catalyst, the upstream-side sensor being configured to output an output value corresponding to an actual air-fuel ratio of gas that is emitted from the internal combustion engine;
   a downstream-side sensor that is arranged downstream of the catalyst, the downstream-side sensor being configured to output an output value corresponding to an actual air-fuel ratio of gas that is emitted from the catalyst; and
   an electronic control unit configured to:
   (i) execute air-fuel ratio control including main feedback correction and sub-feedback correction, the main feedback correction being correction for a fuel injection amount that is injected from the fuel injection valves such that the output value of the upstream-side sensor becomes an output value corresponding to a target air-fuel ratio, the sub-feedback correction being correction for the fuel injection amount that is corrected through the main feedback correction such that the output value of the downstream-side sensor becomes an output value corresponding to the target air-fuel ratio, the sub-feedback correction including a calculation of a sub-correction value including a learning value that compensates for a steady deviation between the output value of the downstream-side sensor and the output value corresponding to the target air-fuel ratio,
   (ii) when there are cylinder-to-cylinder variations in the fuel injection amount that is injected from the fuel injection valves, execute a process of correcting the fuel injection amount that is corrected in the air-fuel ratio control,
   (iii) each time the electronic control unit determines that a degree of the cylinder-to-cylinder variations is lower than or equal to a normal determination value, store the learning value at that point in time as a normal value, and
   (iv) when the degree of the cylinder-to-cylinder variations is higher than or equal to an abnormal determination value, change the learning value at that point in time to the normal value, the abnormal determination value being greater than the normal determination value.

2. The control apparatus according to claim 1, wherein the electronic control unit is configured to:
   (i) increase an amount of correction of the fuel injection amount in the process of correcting the fuel injection amount that is corrected in the air-fuel ratio control as the degree of the cylinder-to-cylinder variations increases, and
   (ii) when the electronic control unit determines that the degree of the cylinder-to-cylinder variations is higher than or equal to the abnormal determination value and when an amount of change in the degree of the cylinder-to-cylinder variations is larger than or equal to a predetermined value, change the learning value to the normal value.

3. The control apparatus according to claim 1, wherein
the fuel injection valves include intake port fuel injection valves and in-cylinder fuel injection valves respectively provided for a plurality of cylinders, each of the intake port fuel injection valves being configured to inject fuel into a corresponding one of intake ports of the internal combustion engine, each of the in-cylinder fuel injection valves being configured to inject fuel into a corresponding one of the cylinders of the internal combustion engine, and
the electronic control unit is configured to:
  (i) each time the electronic control unit determines that both the degree of cylinder-to-cylinder variations in the fuel injection amount that is injected from the intake port fuel injection valves and the degree of cylinder-to-cylinder variations in the fuel injection amount that is injected from the in-cylinder fuel injection valves are lower than or equal to the normal determination value, store the learning value at that point in time as the normal value, and
  (ii) when the electronic control unit determines that at least one of the degree of cylinder-to-cylinder variations in the fuel injection amount that is injected from the intake port fuel injection valves or the degree of cylinder-to-cylinder variations in the fuel injection amount that is injected from the in-cylinder fuel injection valves is higher than or equal to the abnormal determination value, change the learning value at that point in time to the normal value.

4. The control apparatus according to claim 1, wherein
the fuel injection valves include in-cylinder fuel injection valves respectively provided for the plurality of cylinders, each of the in-cylinder fuel injection valves being configured to inject fuel into a corresponding one of the cylinders of the internal combustion engine, and
the electronic control unit is configured to:
  (i) each time the electronic control unit determines that the degree of cylinder-to-cylinder variations in the fuel injection amount that is injected from the in-cylinder fuel injection valves is lower than or equal to the normal determination value, store the learning value at that point in time as the normal value, and
  (ii) when the electronic control unit determines that the degree of cylinder-to-cylinder variations in the fuel injection amount that is injected from the in-cylinder fuel injection valves is higher than or equal to the abnormal determination value, change the learning value at that point in time to the normal value.

* * * * *